(12) United States Patent
Klejc et al.

(10) Patent No.: US 10,414,005 B2
(45) Date of Patent: Sep. 17, 2019

(54) METHOD AND APPARATUS FOR SERVICING COMBUSTION LINERS

(71) Applicants: General Electric Company, Schenectady, NY (US); Adrian Adam Klejc, Warsaw (PL); Stuart Craig Hanson, Greenville, SC (US); John William Herbold, Greenville, SC (US); James Bradford Holmes, Greenville, SC (US); Sandra Beverly Kolvick, Greenville, SC (US); Thomas Alan Mogle, II, Greenville, SC (US); Robert Edward Huth, Greenville, SC (US); Lukasz Sajdak, Warsaw (PL)

(72) Inventors: Adrian Adam Klejc, Siedlce (PL); Stuart Craig Hanson, Anderson, SC (US); John William Herbold, Fountain Inn, SC (US); James Bradford Holmes, Fountain Inn, SC (US); Sandra Beverly Kolvick, Greenville, SC (US); Thomas Alan Mogle, II, Simpsonville, SC (US); Robert Edward Huth, Greenville, SC (US); Lukasz Sajdak, Warsaw (PL)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 15/302,239

(22) PCT Filed: Apr. 9, 2014

(86) PCT No.: PCT/PL2014/000038
§ 371 (c)(1),
(2) Date: Oct. 6, 2016

(87) PCT Pub. No.: WO2015/156691
PCT Pub. Date: Oct. 15, 2015

(65) Prior Publication Data
US 2017/0028516 A1 Feb. 2, 2017

(51) Int. Cl.
B23P 6/00 (2006.01)
F23R 3/00 (2006.01)

(52) U.S. Cl.
CPC .............. B23P 6/005 (2013.01); F23R 3/002 (2013.01); F23R 2900/00017 (2013.01);
(Continued)

(58) Field of Classification Search
CPC .. F23R 2900/00017; F23R 2900/00019; F23R 3/002; B23P 6/005; Y10T 29/4973; Y10T 29/49732; Y10T 29/49734
See application file for complete search history.

(56) References Cited

U.S. PATENT DOCUMENTS

| 7,367,191 B2 | 5/2008 | Bunel et al. |
| 7,555,906 B2 | 7/2009 | Anichini et al. |

(Continued)

FOREIGN PATENT DOCUMENTS

| DE | 10242600 A1 * | 3/2004 | ............ B25B 27/00 |
| DE | 10242600 A1 | 3/2004 | |

(Continued)

OTHER PUBLICATIONS

Attinger, Thomas; Mounting Aid for Joining Part; Mar. 25, 2004; pp. 1-4; EPO English Machine Translation.*

(Continued)

*Primary Examiner* — Bayan Salone
(74) *Attorney, Agent, or Firm* — Frank A. Landgraff; Charlotte C. Wilson; James W. Pemrick (57) ABSTRACT

An apparatus and method for servicing a combustion liner in a combustion case of a turbine is provided. The apparatus includes an elongated bar having a handle at one end and a (Continued)

force applying member at an opposing end of the elongated bar. An attachment member is configured for attachment to a flange of the combustion case. The attachment member is also configured for pivotal attachment to the elongated bar. The apparatus is configured to apply a radially outward force on a downstream portion of the combustion liner when a radially inward force is applied to the handle.

16 Claims, 9 Drawing Sheets

(52) U.S. Cl.
CPC . *F23R 2900/00019* (2013.01); *Y10T 29/4973* (2015.01); *Y10T 29/49732* (2015.01); *Y10T 29/49734* (2015.01)

(56) References Cited

U.S. PATENT DOCUMENTS

| | | | |
|---|---|---|---|
| 8,448,443 | B2 | 5/2013 | Berry et al. |
| 8,617,637 | B2 | 12/2013 | Morimoto et al. |
| 2008/0227040 | A1 | 9/2008 | Dieuloufet |
| 2010/0307000 | A1* | 12/2010 | Herbold ............... F23R 3/60 29/888 |
| 2010/0316966 | A1 | 12/2010 | Boettcher et al. |
| 2011/0000080 | A1 | 1/2011 | Arase et al. |
| 2012/0159955 | A1* | 6/2012 | Shiotani ............... F01D 9/023 60/752 |

FOREIGN PATENT DOCUMENTS

| | | |
|---|---|---|
| DE | 102010017041 A1 | 12/2010 |
| WO | 2007012755 A1 | 2/2007 |
| WO | 2009119149 A1 | 10/2009 |
| WO | 2011033697 A1 | 3/2011 |

OTHER PUBLICATIONS

PCT Search Report and Written Opinion issued in connection with corresponding PCT Application No. PCT/PL2014/000038 dated Dec. 16, 2014.

* cited by examiner

METHOD AND APPARATUS FOR SERVICING COMBUSTION LINERS

BACKGROUND

Embodiments disclosed herein relate to gas turbine engines and, more specifically, to a method and apparatus to remove and/or install combustion liners.

Gas turbine engines typically include a combustor having a combustion liner defining a combustion chamber. Within the combustion chamber, a mixture of compressed air and fuel is combusted to produce hot combustion gases. The combustion gases may flow through the combustion chamber to one or more turbine stages to generate power for driving a load and/or a compressor. Typically, the combustion process heats the combustion liner due to the hot combustion gases.

Combustion liners are routinely removed and installed during gas turbine maintenance activity. Some known removal tooling, on the most part, can be awkward but slowly helps remove combustion liners without significant damage. The combustion liner stops require circumferential alignment within each combustion chamber, typically between the male combustion liner stops and the female combustion liner stops. Hula seals can require several hundred pounds of axial installation force, which is often applied with a manually operated hammer or a series of mechanical fasteners. Currently, a technician must reach into the combustion liner to manually align the liner with the hula seal. In some cases, most of the technician will be inside the liner. This may be an undesirable confined space situation, as the working space is limited and egress is difficult. However, without proper liner stop alignment, if the liner is rotated while the hula seal is under load, then torsional loading of the hula seal can damage the seal leafs or seal coating.

BRIEF DESCRIPTION

Certain embodiments are summarized below. These embodiments are not intended to limit the scope of the application, but rather these embodiments are intended only to provide a brief summary of possible forms. Indeed, embodiments may encompass a variety of forms that may be similar to or different from the embodiments set forth below.

In one aspect of the present invention, an apparatus for servicing a combustion liner in a combustion case of a turbine is provided. The apparatus includes an elongated bar having a handle at one end and a force applying member at an opposing end of the elongated bar. An attachment member is configured for attachment to a flange of the combustion case. The attachment member is also configured for pivotal attachment to the elongated bar. The apparatus is configured to apply a radially outward force on a downstream portion of the combustion liner when a radially inward force is applied to the handle.

In another aspect of the present invention, a method of servicing a combustion liner in a combustion case of a turbine includes the steps of providing an elongated bar having a handle at one end and a force applying member at an opposing end of the elongated bar. An attaching step is used for attaching an attachment member to a flange of the combustion case. The attachment member is configured for pivotal attachment to the elongated bar. An applying step applies force to the handle of the elongated bar, which results in the application of a related force to the combustion liner. A radially inward force applied to the handle causes a radially outward force on a downstream portion of the combustion liner.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

Before continuing, several terms used extensively throughout the present disclosure will be first defined in order to provide a better understanding of the claimed subject matter. As used herein, the terms "upstream" and "downstream," when discussed in conjunction with a combustion liner, shall be understood to mean the proximal end of the combustion liner and the distal end of the combustion liner, respectively, with respect to the fuel nozzles. That is, unless otherwise indicated, the terms "upstream" and "downstream" are generally used with respect to the flow of combustion gases inside the combustion liner. For example, a "downstream" direction refers to the direction in which a fuel-air mixture combusts and flows from the fuel nozzles towards a turbine, and an "upstream" direction refers to the direction opposite the downstream direction, as defined above. Additionally, the term "downstream end portion," "coupling portion," or the like, shall be understood to refer to an aft-most (downstream most) portion of the combustion liner. As will be discussed further below, the axial length of the downstream end portion of the combustion liner, in certain embodiments, may be as much as 20 percent the total axial length of the combustion liner. The downstream end portion (or coupling portion), in some embodiments, may also be understood to be the portion of the liner that is configured to couple to a downstream transition piece of the combustor, generally in a telescoping, concentric, or coaxial overlapping annular relationship. Further, where the term "liner" appears alone, it should be understood that this term is generally synonymous with "combustor liner" or "combustion liner". Keeping in mind the above-defined terms, the present disclosure is directed towards a method and apparatus to remove and/or install a combustion liner of a turbine engine.

Figure 1:
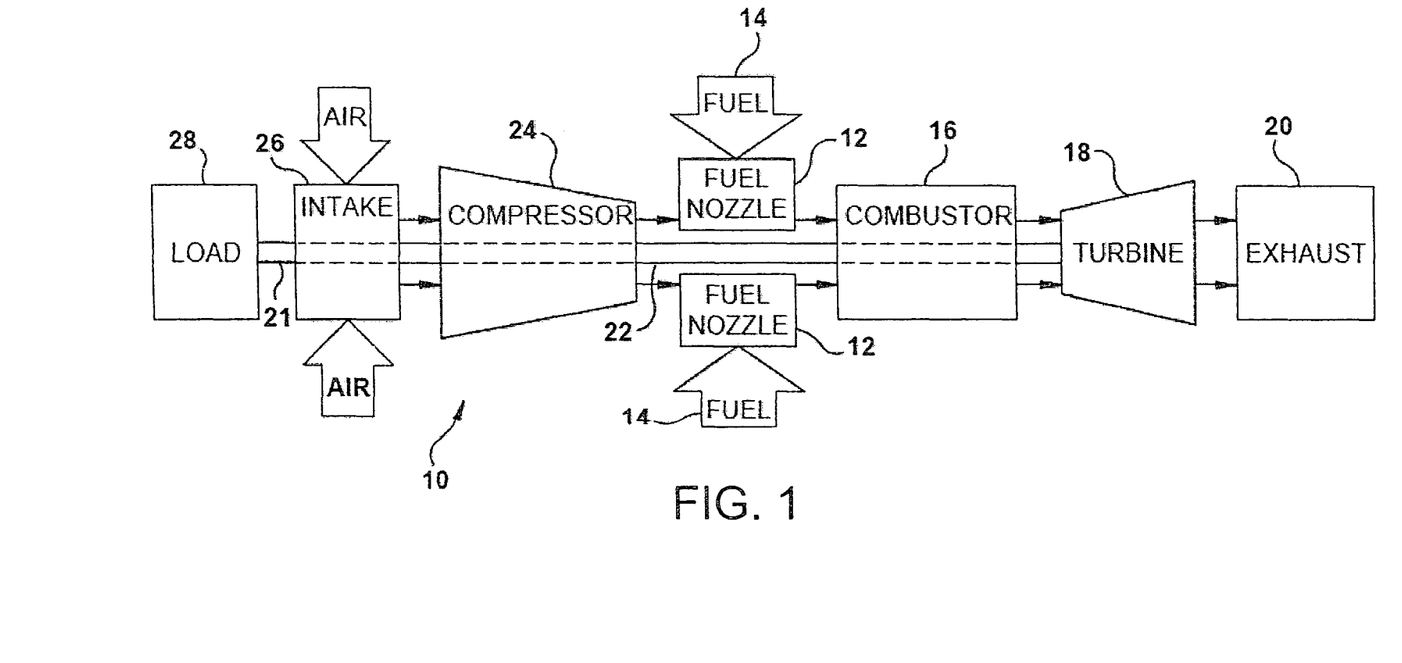
FIG. 1 is a block diagram illustration of a turbine system having a combustor liner.

Turning now to the drawings and referring first to FIG. 1, a block diagram of an embodiment of a turbine system 10 is illustrated. As discussed in detail below, the disclosed turbine system 10 may employ a combustion liner having a plurality of surface features formed about a downstream end portion to provide for improved and more uniform cooling of the liner. The turbine system 10 may use liquid or gas fuel, such as natural gas and/or a hydrogen rich synthetic gas, to run the turbine system 10. As depicted, one or more fuel nozzles 12 intake a fuel supply 14, mix the fuel with air, and distribute the air-fuel mixture into a combustor 16. The air-fuel mixture combusts in a chamber within combustor 16, thereby creating hot pressurized exhaust gases. The combustor 16 directs the exhaust gases through a turbine 18 toward an exhaust outlet 20. As the exhaust gases pass through the turbine 18, the gases force one or more turbine blades to rotate a shaft 22 along an axis of system 10. As illustrated, the shaft 22 is connected to various components of turbine system 10, including a compressor 24. The compressor 24 also includes blades that may be coupled to shaft 22. Thus, blades within compressor 24 rotate as shaft 22 rotates, thereby compressing air from an air intake 26 through compressor 24 and into fuel nozzles 12 and/or combustor 16. The shaft 21 may be connected to a load 28, which may be a vehicle or a stationary load, such as an electrical generator in a power plant or a propeller on an aircraft. As will be understood, the load 28 may include any suitable device that is capable of being powered by the rotational output of turbine system 10. The load 28 may also be taken on the turbine end of the gas turbine.

Figure 2:
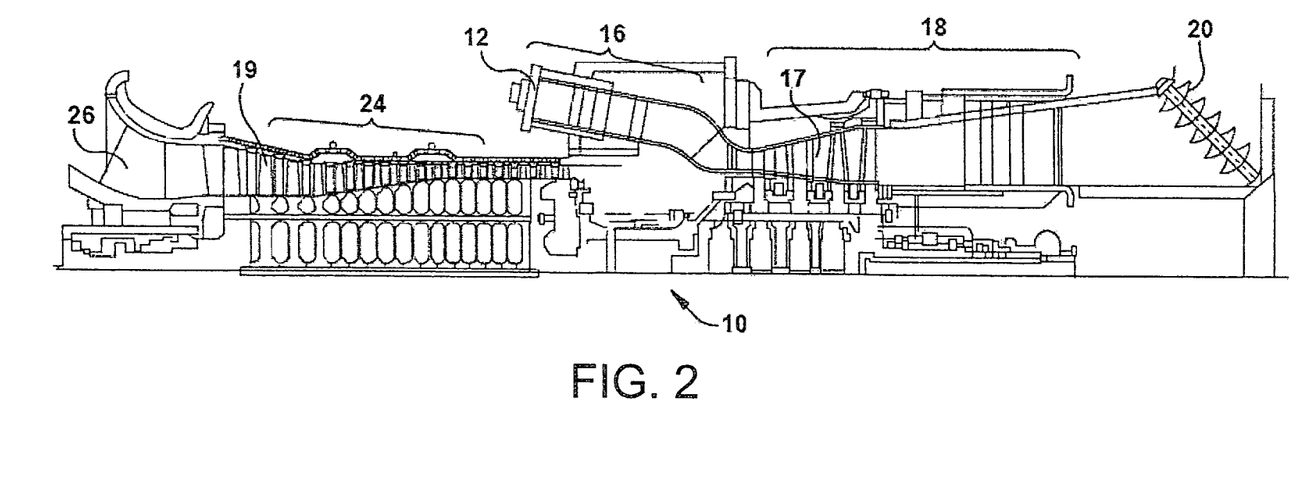
FIG. 2 is a cutaway side illustration of the turbine system, as shown in FIG. 1.

FIG. 2 illustrates a cutaway side view of an embodiment of the turbine system 10 schematically depicted in FIG. 1. The turbine system 10 includes one or more fuel nozzles 12 located inside one or more combustors 16. The combustors 16 may include one or more combustion liners typically disposed within one or more respective flow sleeves. In operation, air enters the turbine system 10 through the air intake 26 and may be pressurized in the compressor 24. The compressed air may then be mixed with gas for combustion within combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive one or more blades 17 within the turbine 18 to rotate the shaft 22 (shown in FIG. 1) and, thus, the compressor 24 and the load 28 (shown in FIG. 1). The rotation of the turbine blades 17 causes rotation of shaft 22, thereby causing the blades 19 within the compressor 22 to draw in and pressurize the air received by the intake 26. As the portion of the compressor-supplied air (which is generally substantially cooler relative to the combustion gases within the combustor 16) flows through the cooling channel and contacts the surface features, heat transfer occurs in which heat is removed from the combustor liner. By way of example, this heat transfer may occur via forced convection.

Figure 3:
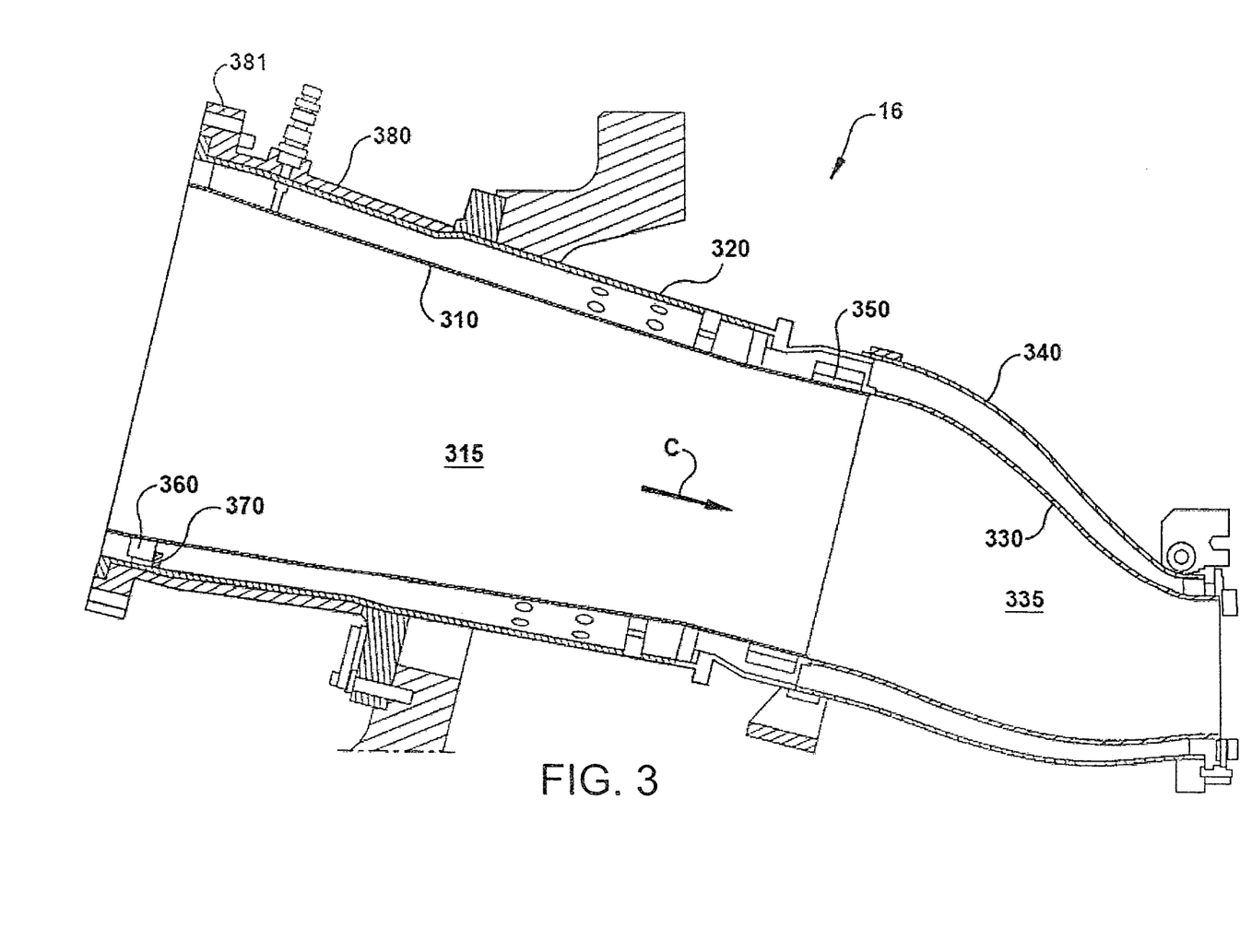
FIG. 3 is a cutaway side illustration of the combustor having a combustion liner, in accordance with an aspect of the present invention.

Continuing now to FIG. 3, a more detailed cutaway side view of an embodiment of the combustor 16 is illustrated. As will be appreciated, the combustor 16 is generally fluidly coupled to the compressor 24 and the turbine 18. The combustor 16 includes a combustion liner 310 disposed within a flow sleeve 320. Flow sleeves may be used in conjunction with combustion liners, but some applications may omit the flow sleeve. The interior of the liner 310 may define a substantially cylindrical or annular combustion chamber 315. The combustion liner 310 illustrated is only one example of many variations of combustion liners that may be used with the method and apparatus disclosed herein. Downstream from the liner 310 and the flow sleeve 320 (e.g. in the direction C), a transition piece 330 may be coupled to the liner 310. Thus, the direction C may represent a downstream direction with respect to the flow of combustion gases away from the fuel nozzles 12 inside the liner 310.

The transition piece 330 (which may also be referred to as a "transition duct") may be disposed within an impingement sleeve 340. An interior cavity 335 of the transition piece 330 generally provides a flow path (as shown by the arrow C) by which combustion gases from the combustion chamber 315 may be directed to the turbine 18. In the depicted embodiment, the transition piece 330 may be coupled to the downstream end of the liner 310 (in the direction C) with a seal 350 (e.g., a hula seal). In some combustion liner embodiments, a hula seal may seal the junction between the combustion liner and the transition piece. Hula seals are circumferential metal seals that may be slotted in the axial direction and contoured to be spring loaded between an inner and outer diameter of mating parts that experience relative motion. Hula seals can be located between the combustion liner aft (i.e. downstream) end and the transition piece forward end (i.e. upstream).

The combustion liner 310 may incorporate one or more male liner stops 360 that engage one or more female liner stops 370 attached to a flow sleeve 320. In some embodiments without a flow sleeve, the stops may be attached to the interior of combustion case 380. The combustion case 380 typically also includes a flange 381. The female liner stop 370 is generally "U"-shaped and the male liner stop 360 is generally rectangular in cross-section and fits within female liner stop 370. The liner stops require circumferential alignment within each combustion chamber, typically between the male combustion liner stops 360 and the female combustion liner stops 370. The liner stops aid in installation/removal of the liner 310, and prevent the liner 310 from rotating during operation of turbine 10.

Hula seal 350 seals the downstream end of combustion liner 310 to the upstream end of transition piece 330. Hula seals can require several hundred pounds of axial installation force, which in the past has typically been applied with a hammer. Hammering force has variation, can damage parts, and can injure humans. Without proper liner stop alignment, the liner can be rotated while the hula seal is under load within the transition piece inlet diameter. Torsional loading of the hula seal can damage the seal leafs or seal coating.

Figure 4:
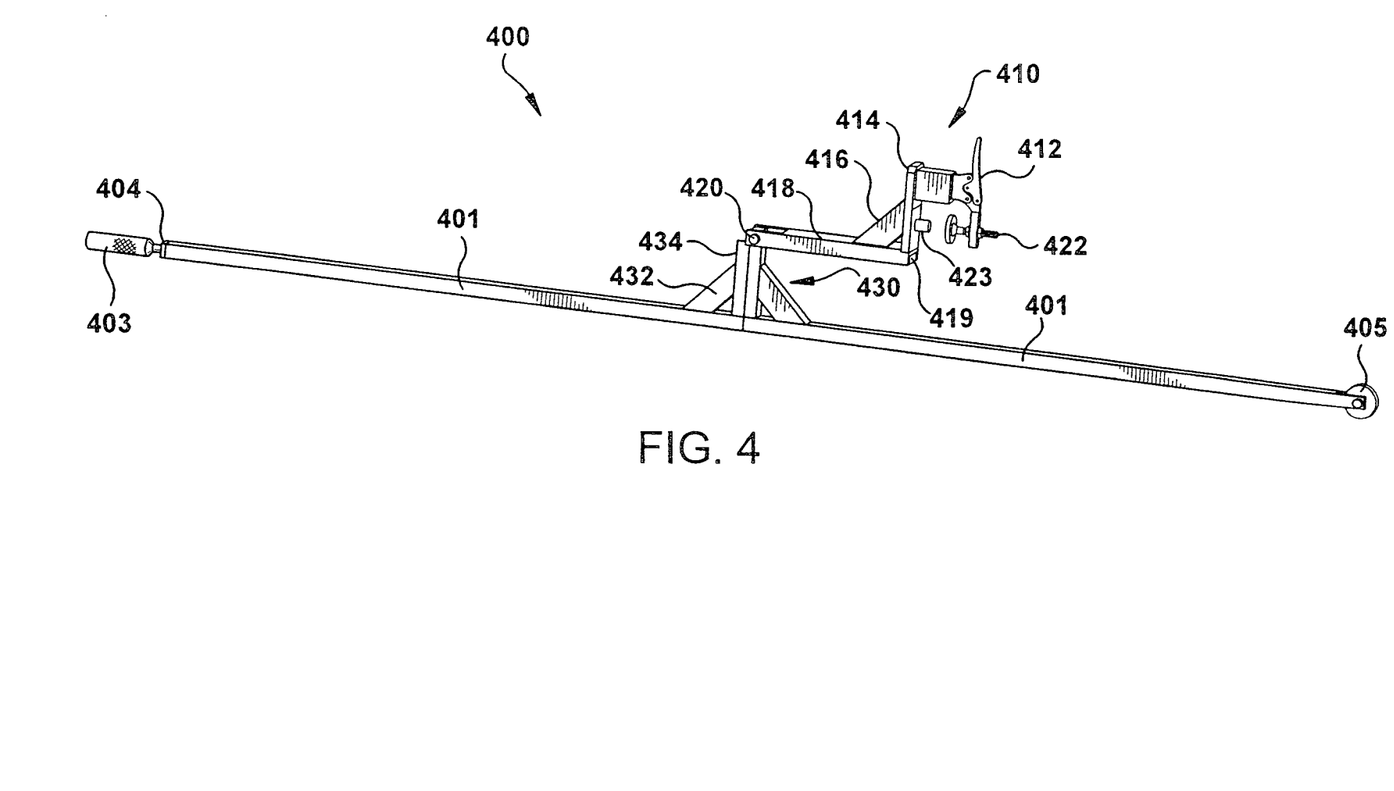
FIG. 4 illustrates a perspective view of an apparatus for use when servicing combustion liners, according to an aspect of the present invention.

FIG. 4 illustrates a perspective view of an apparatus for use when servicing combustion liners, according to an aspect of the present invention. A combustion liner servicing apparatus (e.g., a tool for installation and removal), according to an aspect of the present invention, will now be described in conjunction with FIG. 4. The apparatus 400 is comprised of an elongated bar 401 having a handle 403 at one end and a force applying member 405 at an opposing end of the elongated bar 401. The elongated bar 401 may be comprised of one or multiple bar sections joined together. The bar 401 may be comprised of steel, aluminum or any suitable strength material and may have a rectangular, circular or oval cross-sectional shape. The handle 403 may be attached to bar 401 via a threaded base plate 404, or the end (or any portion) of the bar may comprise the handle. The base plate may be welded or adhesively connected to the bar 401. The force applying member 405 may be a wheel or ball comprised of a material or coating configured to resist damaging the combustion liner 310 or any thermal barrier coating applied thereon. For example, the wheel or ball 405 may be comprised of, or coated with acetal resin, plastic, polypropylene, polytetrafluoroethylene, rubber, or any other suitable material. In the case of a wheel, the end of bar 405 may comprise a U-shaped channel through which the wheel 405 is received and retained (e.g., by mechanical fasteners).

An attachment member 410 is configured for attachment to a flange 381 of the combustion case. The attachment member 410 is also configured for pivotal attachment to the elongated bar 401. The attachment member 410 includes a clamp 412 (e.g., a hold down clamp), a liner guide clamp 414, angle bracket 416 and a liner guide 418. The liner guide 418 includes a U-shaped end through which a bracket assembly 430 is pivotally attached. The bracket assembly 430 is comprised of one or more angle brackets 432 and bar members 434. The bracket assembly 430 may be located near a middle portion of the elongated bar 401, and the bracket assembly 430 is configured for pivotal attachment to the attachment member 410. For example, the bar member 434 may be attached to liner guide 418 with mechanical fasteners 420 (e.g., nuts, bolts and washers, pin and cotter pin, etc.) or any other suitable device that allows for rotational or pivotal movement between the bar member 434 and liner guide 418. In use, the elongated bar 401 may pivot about fastener 420, such that when a radially inward force (down in FIG. 4) is applied to the handle 403 a radially outward force (up in FIG. 4) is imparted on a downstream portion of the combustion liner via force applying member 405.

The liner guide 418 may also include a slot 419 configured for guiding the liner stop 360 on the combustion liner in an axial direction. The slot 419 may extend through all or a portion of the liner guide 418. The clamp 412 may also include an adjustable spindle 422 that can be adjusted back and forth in the axial direction to accommodate various widths of flanges 381. A pin 423, which is attached to liner clamp 414, can be inserted within one of the holes in the flange and help to radially secure the apparatus to the flange in combination with the clamp 412 and spindle 422.

Figure 5:
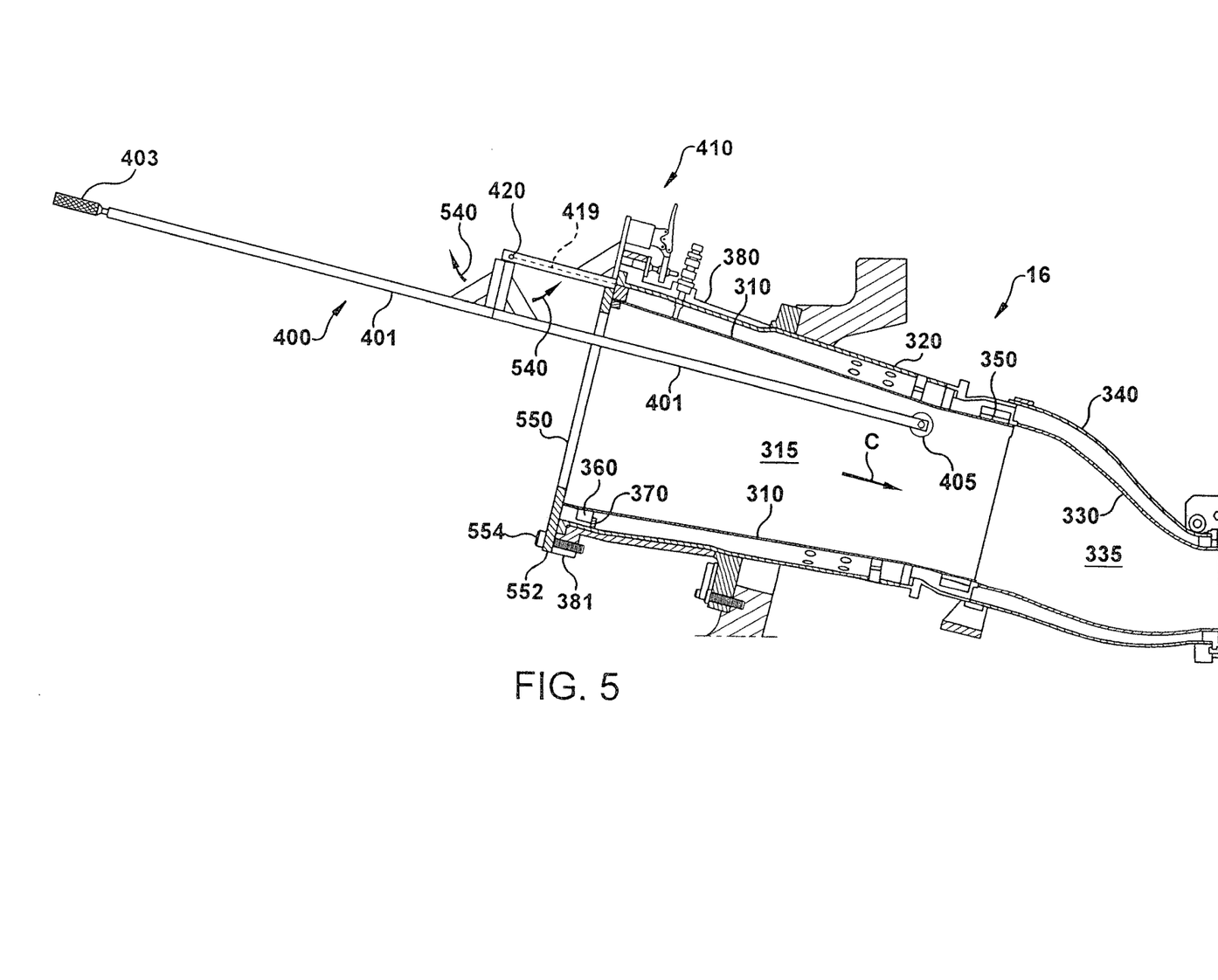
FIG. 5 illustrates a cross-sectional view of the apparatus of FIG. 4 mounted on a combustor, according to an aspect of the present invention.

FIG. 5 illustrates a cross-sectional view of the apparatus 400 mounted on a combustor 16, according to an aspect of the present invention. The attachment member 410 is clamped onto the flange 381. The elongated bar 401 is arranged so that it projects into the combustion liner 310. As described previously, the elongated bar can pivot about mechanical fastener 420 and can pivot as illustrated by arrows 540. When the handle 403 is pushed radially downward (down in FIG. 5) then the wheel is forced radially upward (up in FIG. 5). The wheel 405 will contact the combustion liner 310 and can be used to manually position the downstream portion of the combustion liner 310 so that it aligns with hula seal 350. In the past, this operation was very difficult, because a technician had to crawl into the combustion liner and attempt to align the combustion liner and hula seal by hand. The cramped quarters made this difficult and the possibility existed for one's hands to get pinched in the process. By using the apparatus 400, the technician no longer needs to crawl into the combustion liner, nor experiences the possibility of getting their hands pinched between the hula seal and combustion liner. A combustion liner ring 550 may also be used to support the upstream portion of the combustion liner 310 during servicing (e.g., during installation or removal). The wheel 405 is used to support the downstream portion of the combustion liner.

Figure 6:
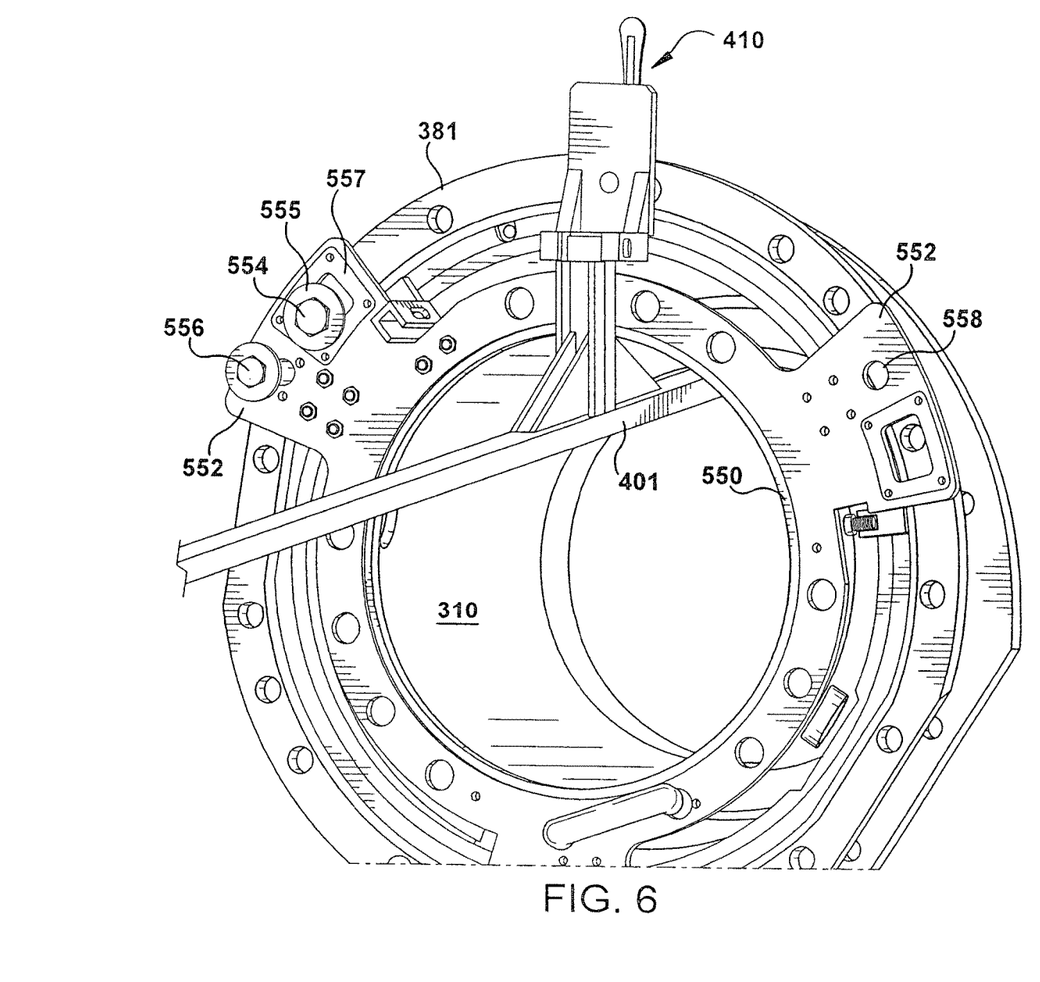
FIG. 6 illustrates a partial perspective view of a ring positioned over a combustor opening, according to an aspect of the present invention.

FIG. 6 illustrates a partial perspective view of the ring 550 positioned over a combustor opening, according to an aspect of the present invention. The ring 550 may include projections that support the upstream portion of the combustion liner 310, or the ring can be mechanically fastened or clamped to the combustion liner 310. The ring includes a plurality (e.g., about 3) of radially extending ears 552 that include apertures through which fasteners 554, such as bolts or screws, can pass. The bolt 554 can be threaded into a hole of the flange 381. If desired a washer 555 and/or backing plate 557 may also be used. As bolt 554 is tightened, the ring moves toward flange 381 and drives the combustion liner axially into the combustor 16 and into engagement with hula seal 350. The ring 550 may also be used to pull the combustion liner out of the combustor and away from the hula seal by reversing the process. For example, a bolt 556 may be inserted into threaded hole 558, and hole 558 is located so that it does not align with the flange holes. In this manner, as the bolt 556 is tightened it pushes the ring 550 away from the flange 381, as well as pulling the combustion liner 310 away from hula seal 350.

Figure 7:
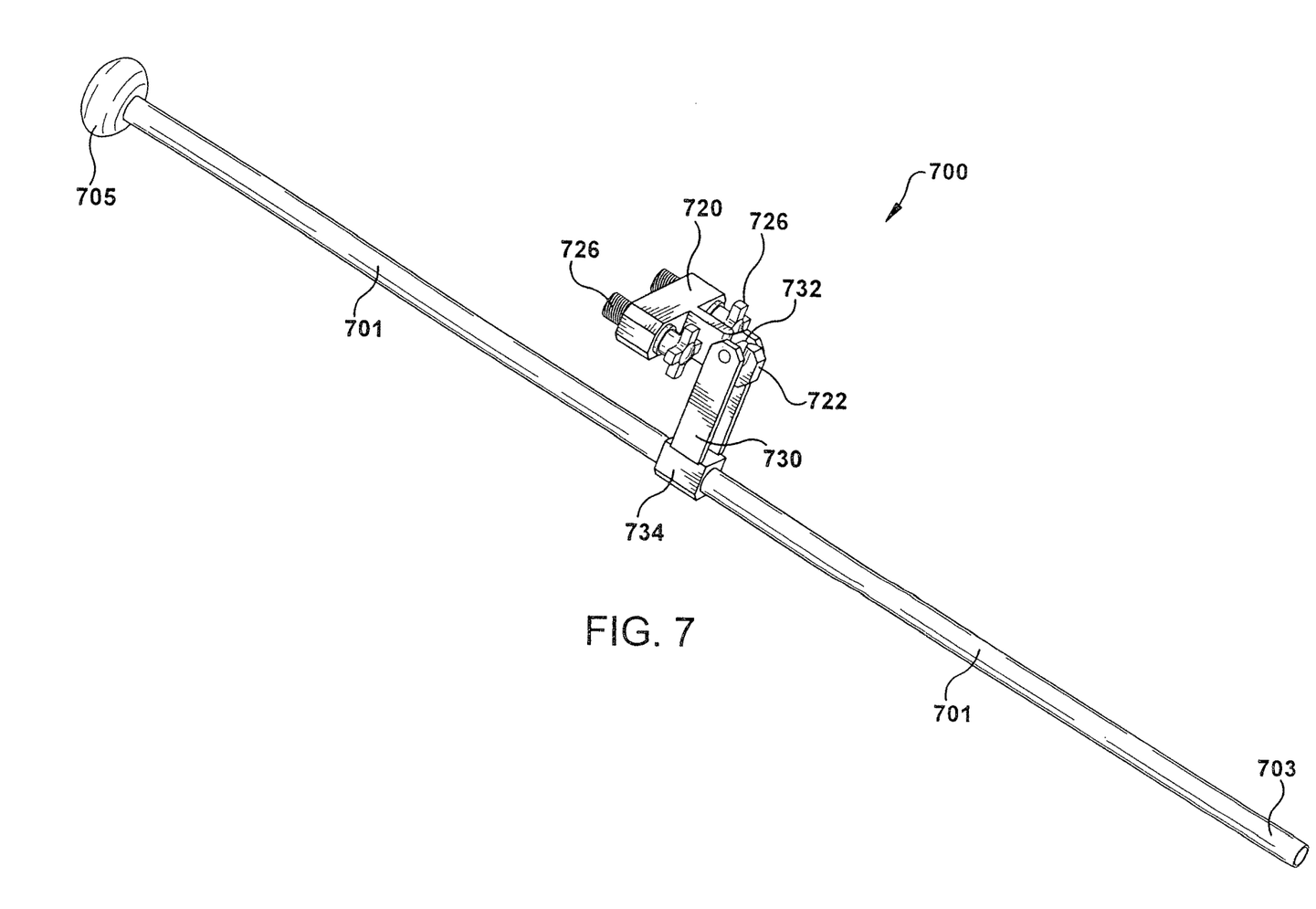
FIG. 7 illustrates a perspective view of an apparatus for use when servicing combustion liners in gas turbines, according to an aspect of the present invention.

FIG. 7 illustrates a perspective view of an apparatus 700 for use when servicing combustion liners in gas turbines, according to an aspect of the present invention. The apparatus 700 includes an elongated bar 701 having a handle 703 at one end and a force applying member 705 at an opposing end of the bar 701. The bar 701 may be comprised of a metal pipe or bar, or any other suitable material. The handle 703 may be the end of bar 701, may include grip enhancing features (e.g., knurled or ribbed surface, grip-enhancing tape, rubber sleeve, etc.), or may be any part of the bar 701 that is conveniently grasped by a user. The force applying member 705 may be a wheel or ball comprised of a material or coating configured to resist damaging the combustion liner 310 or any thermal barrier coating applied thereon. For example, the wheel or ball 705 may be comprised of, or coated with acetal resin, plastic, polypropylene, polytetrafluoroethylene, rubber, or any other suitable material.

An attachment member 710, which is configured for attachment to the flange 381, includes a bracket hook 720 and a hanging bracket 730. The bracket hook 720 includes a hook 722 connected to (or integrally formed therewith) a mounting member 724. The mounting member 724 includes two holes for a pair of mechanical fasteners 726. The fasteners 726 may be bolts, threaded hand knobs, or any other suitable externally threaded fastener that can be inserted into the internally threaded flange mounting holes. The hook 722 projects axially upstream from the flange 381. The hanging bracket 730 is configured to support and allow slidable motion of the elongated bar or pipe 701. The bracket 730 includes a pin 732 that is configured to hang on hook 722. Both the hook 722 and pin 732 are configured to allow the bar 701 to pivot along two substantially orthogonal axes. The bracket hook also includes a bar section 734 through which bar 701 may be inserted. The inner diameter of the hole in the bar section 734 is sized larger than the outer diameter of bar 701, so that the bar 701 may be slid back and forth through the bar section.

Figure 8:
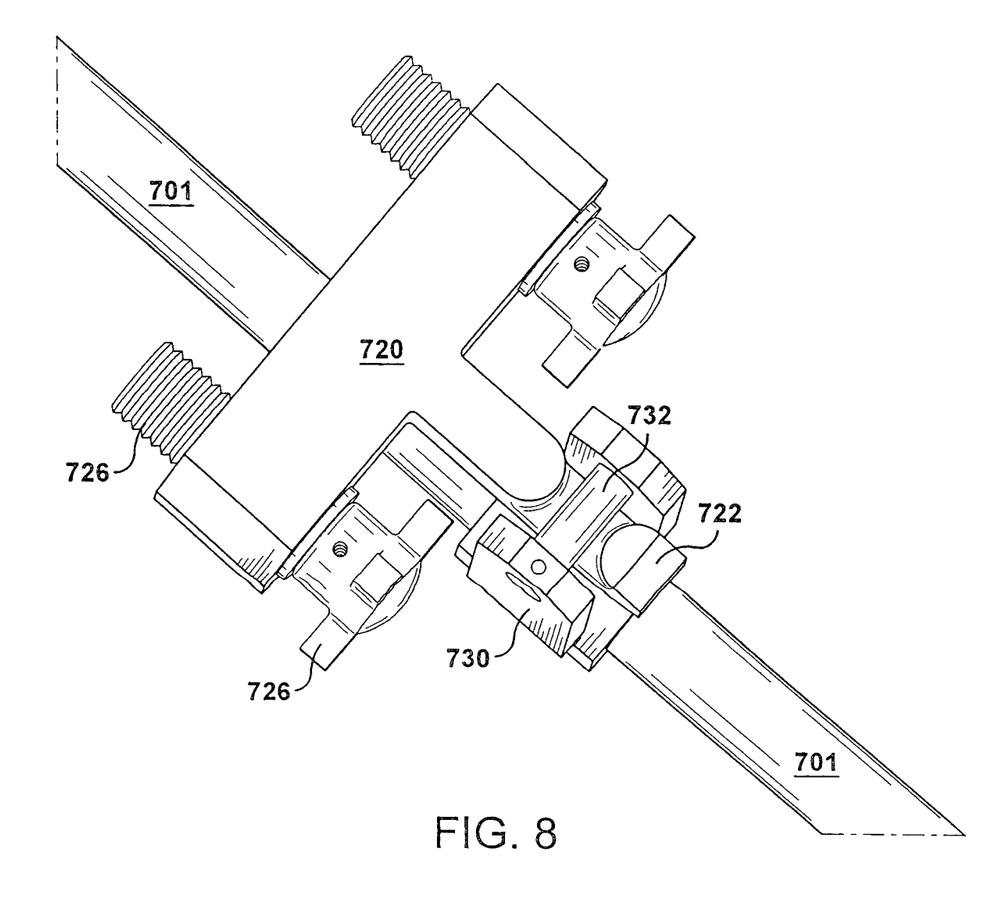
FIG. 8 illustrates a top view of the bracket hook and hanging bracket, according to an aspect of the present invention.

FIG. 8 illustrates a top view of the bracket hook 720 and hanging bracket 730, according to an aspect of the present invention. The opening (or gap) in the hook is sized to be larger than the diameter of the pin 732. For example, the hook opening may be about one inch and the diameter of the pin 732 may be about ½ inch. In other aspects, the hook opening is at least about 50% to about 100% larger or more than the outer diameter of the pin 732. This difference in size allows the pin 732 (and bar 701) to pivot in the X-Y (e.g., horizontal) plane. The pin 732 can also roll in the axial direction, so that the bar 701 can pivot in the Z (or vertical) plane. The apparatus 700 permits a great degree of freedom for the bar 701 and wheel or ball 705. The bar 701 can be slid back and forth so that the ball 705 may be accurately positioned near the downstream portion of the combustion liner 310. The bar 701 can be pivoted horizontally so that the ball 705 can be positioned over a circumferential arc of positions on the combustion liner, and the bar can be pivoted vertically, so that the ball can be used to lift up (or push down) on the downstream end of the combustion liner and into alignment with a hula seal.

Figure 9:
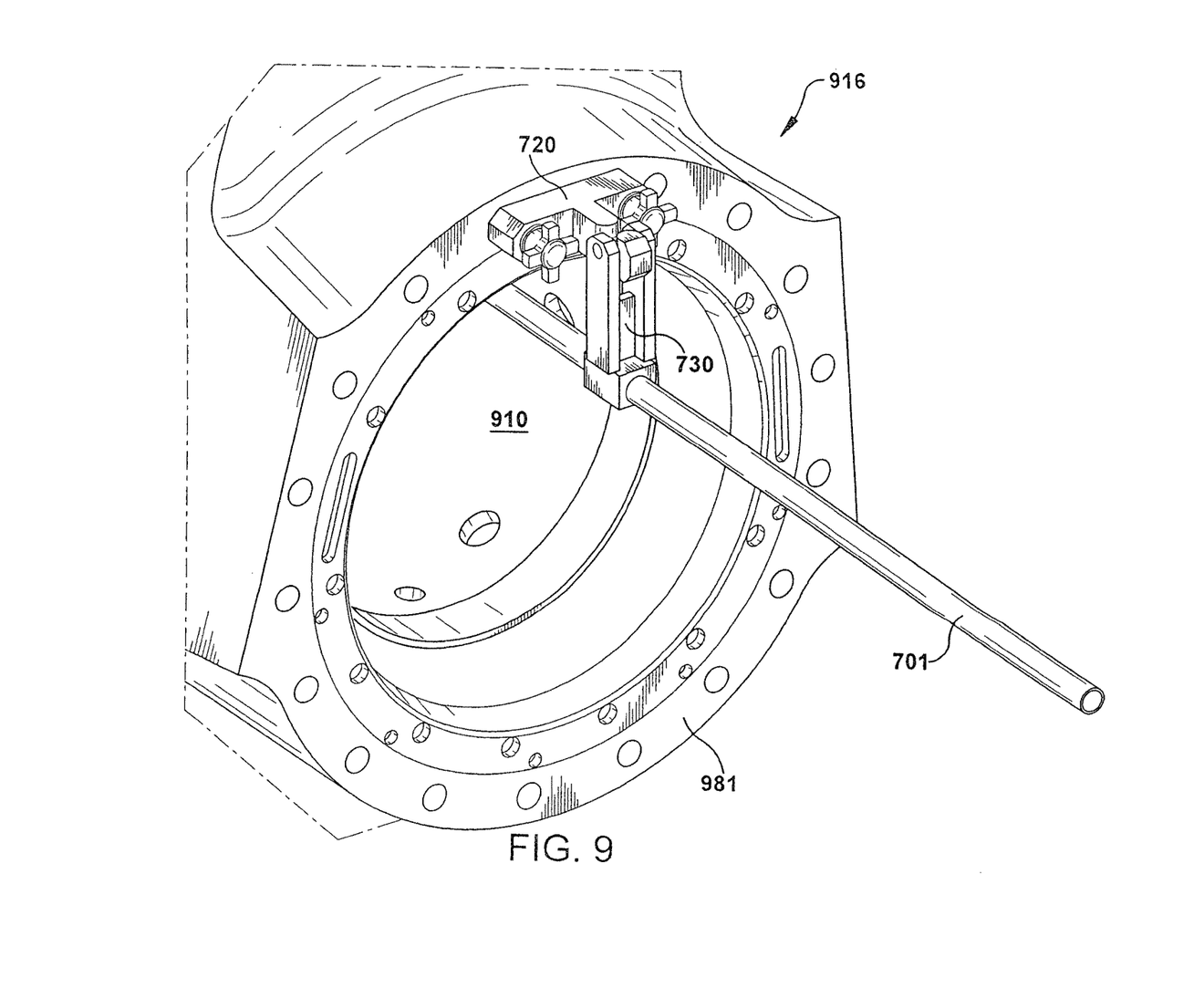
FIG. 9 illustrates a perspective view of the apparatus of FIG. 7 mounted on a combustor, according to an aspect of the present invention.

FIG. 9 illustrates a perspective view of the apparatus 700 mounted on a combustor, according to an aspect of the present invention. The bracket hook 720 is bolted to the flange 981 of the combustor 916. The elongated bar or pipe 701 is slid into the hanging bracket 730 and the hanging bracket 730 is hung on the hook 722 via pin 732. In this arrangement, the downstream end of the combustion liner 910 can be supported and manipulated by the ball 705. It is also to be understood that the ring 550 could also be used with the apparatus 700 when servicing a combustion liner 910.

A method of servicing a combustion liner in a combustion case of a turbine, will now be described. The method includes the steps of providing an elongated bar 401, 701 having a handle 403, 703 at one end and a force applying member 405, 705 at an opposing end of the elongated bar. An attaching step attaches an attachment member 410, 710 to a flange 381 of the combustion case. This step may include clamping the attachment member onto the flange, or using mechanical fasteners that are screwed into the flange to secure the attachment member to the flange. The attachment member 410, 710 is configured for pivotal attachment to the elongated bar. A force applying step applies force to the handle of the elongated bar to apply a related force to the combustion liner. For example, a radially inward force applied to the handle causes a radially outward force on a downstream portion of the combustion liner.

The elongated bar 401, 701 may be used in conjunction with a bracket assembly 430, 730 located near a middle portion of the elongated bar, where the bracket assembly is configured for pivotal attachment to the attachment member. The attachment member 410 may also include a liner guide 418 having a slot 419 configured for guiding a liner stop 360 on the combustion liner 310. The force applying member 405, 705 may include a wheel or ball comprised of a material configured to resist damaging the combustion liner; and this material may be comprised of acetal resin, plastic, polypropylene, polytetrafluoroethylene, rubber or combinations thereof. The material may be coated on the wheel or ball or may comprise a substantial portion of the wheel or ball.

The attachment member 720 may also include a hook 722 that is configured for attachment to the flange by mechanical fasteners, wherein the hook 722 projects axially upstream from the flange. A bracket 730 is configured to support and allow slidable motion of the elongated bar 701 therethrough, and the bracket 730 includes a pin 732 configured to hang on the hook 722. The hook 722 and pin 732 are both configured to allow the elongated bar 701 to pivot along two or more substantially orthogonal axes.

The apparatus and method described herein may be used on any suitable gas turbine or turbomachine needing to have substantially cylindrical or frusto-conical elements installed or removed. The apparatus and method described herein may also be used to install or remove substantially cylindrical or frusto-conical elements from annular seals.

This written description uses examples to disclose the embodiments, including the best mode, and also to enable any person skilled in the art to practice the embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for servicing a combustion liner in a combustion case of a turbine, the apparatus comprising:
   an elongated bar having a handle at one end and a force applying member at an opposing end of the elongated bar;
   an attachment member configured for attachment to a flange of the combustion case, the attachment member also configured for pivotal attachment to the elongated bar, the attachment member comprising a hook that is configured for attachment to the flange by mechanical fasteners, wherein the hook projects axially upstream from the flange;
   a bracket configured to support and allow slidable motion of the elongated bar therethrough, the bracket including a pin configured to hang on the hook, wherein both the hook and pin are configured to allow the elongated bar to pivot along two substantially orthogonal axes; and
   wherein the apparatus is configured to apply a radially outward force on a downstream portion of the combustion liner when a radially inward force is applied to the handle.

2. The apparatus of claim 1, the elongated bar further comprising:

a bracket assembly located near a middle portion of the elongated bar, the bracket assembly configured for pivotal attachment to the attachment member.

3. The apparatus of claim 1, the force applying member further comprising:
a wheel or ball comprised of a material configured to resist damaging the combustion liner.

4. The apparatus of claim 3, wherein the wheel or ball are comprised of or coated with: acetal resin, plastic, polypropylene, polytetrafluoroethylene, or rubber.

5. The apparatus of claim 1, the attachment member further comprising:
a liner guide having a slot configured for guiding a liner stop on the combustion liner.

6. The apparatus of claim 1, the attachment member further comprising:
a clamp configured for clamping onto the flange.

7. The apparatus of claim 1, wherein an opening of the hook is sized to be larger than a diameter of the pin.

8. The apparatus of claim 7, wherein the opening of the hook is sized to be at least about 50% to about 100% larger than the diameter of the pin.

9. The apparatus of claim 7, the force applying member further comprising:
a wheel or ball comprised of a material configured to resist damaging the combustion liner.

10. The apparatus of claim 9, wherein the wheel or ball are comprised of or coated with: acetal resin, plastic, polypropylene, polytetrafluoroethylene, or rubber.

11. A method of servicing a combustion liner in a combustion case of a turbine, the method comprising:
providing an elongated bar having a handle at one end and a force applying member at an opposing end of the elongated bar;
attaching an attachment member to a flange of the combustion case, the attachment member configured for pivotal attachment to the elongated bar, the attachment member comprising a hook configured for attachment to the flange by mechanical fasteners, wherein the hook projects axially upstream from the flange, and a bracket configured to support and allow slidable motion of the elongated bar therethrough, the bracket including a pin configured to hang on the hook, and both the hook and pin are configured to allow the elongated bar to pivot along two substantially orthogonal axes; and
applying force to the handle of the elongated bar to apply a related force to the combustion liner, wherein a radially inward force applied to the handle causes a radially outward force on a downstream portion of the combustion liner.

12. The method of claim 11, the attaching step further comprising:
clamping the attachment member onto the flange.

13. The method of claim 11, the attaching step further comprising:
using mechanical fasteners that are screwed into the flange to secure the attachment member to the flange.

14. The method of claim 11, wherein the elongated bar further comprises:
a bracket assembly located near a middle portion of the elongated bar, the bracket assembly configured for pivotal attachment to the attachment member.

15. The method of claim 14, wherein the attachment member further comprises:
a liner guide having a slot configured for guiding a liner stop on the combustion liner.

16. The method of claim 11, wherein the force applying member further comprises:
a wheel or ball comprised of a material configured to resist damaging the combustion liner; and
wherein the material is comprised of acetal resin, plastic, polypropylene, polytetrafluoroethylene or rubber.

* * * * *